(12) United States Patent
Li (10) Patent No.: US 7,990,539 B2
(45) Date of Patent: Aug. 2, 2011

(54) SENSOR AND METHOD UTILIZING MULTIPLE OPTICAL INTERFEROMETERS

(76) Inventor: Chian Chiu Li, San Jose, CA (US)

(*) Notice: Subject to any disclaimer, the term of this patent is extended or adjusted under 35 U.S.C. 154(b) by 286 days.

(21) Appl. No.: 12/348,262

(22) Filed: Jan. 2, 2009

(65) Prior Publication Data

US 2009/0174885 A1 Jul. 9, 2009

Related U.S. Application Data

(60) Provisional application No. 61/018,671, filed on Jan. 3, 2008.

(51) Int. Cl.
*G01B 9/02* (2006.01)

(52) U.S. Cl. .............................................. 356/450

(58) Field of Classification Search .................. 356/451, 356/496, 501, 502, 517, 521, 450
See application file for complete search history.

(56) References Cited

U.S. PATENT DOCUMENTS

| | | | | |
|---|---|---|---|---|
| 5,420,688 A | * | 5/1995 | Farah | 356/477 |
| 5,891,747 A | * | 4/1999 | Farah | 438/31 |
| 2006/0192974 A1 | * | 8/2006 | Li | 356/496 |
| 2007/0103697 A1 | * | 5/2007 | Degertekin | 356/501 |
| 2008/0024763 A1 | * | 1/2008 | Li | 356/73 |

* cited by examiner

*Primary Examiner* — Michael A Lyons

(57) ABSTRACT

Disclosed is a low-cost high-resolution compact accelerometer which utilizes multiple self-mixing optical interferometers. The device is also a micro-opto-electro-mechanical systems (MOEMS) sensor. The interferometers are used to detect acceleration as well as monitor the wavelength, temperature, and refractive index and perform differential measurements. In addition, photodetectors are employed to monitor the input optical power.

20 Claims, 6 Drawing Sheets

SENSOR AND METHOD UTILIZING MULTIPLE OPTICAL INTERFEROMETERS

CROSS REFERENCE TO RELATED APPLICATION

This application is entitled to the benefit of Provisional Patent Application Ser. No. 61/018,671, filed Jan. 3, 2008. This application is also related to U.S. application Ser. No. 11/307,319, filed Feb. 1, 2006 now U.S. Pat. No. 7,518,731 and entitled "Interferometric MOEMS Sensor" and U.S. application Ser. No. 11/768,265, filed Jun. 26, 2007, and entitled "Optical Interferometer And Method."

FEDERALLY SPONSORED RESEARCH

Not applicable

SEQUENCE LISTING OR PROGRAM

Not applicable

BACKGROUND

1. Field of Invention

This invention relates to sensors utilizing optical interferometer, and particularly to high-resolution sensors utilizing multiple optical interferometers.

2. Description of Prior Art

Previously disclosed interferometric accelerometers can be made compact thanks to the technology of micro-electro-mechanical systems (MEMS) or micro-opto-electro-mechanical systems (MOEMS). But because interferometers usually involve discrete bulky components, such as focus lens, further dimension reduction is hindered. Additionally, it is also difficult to reduce the cost further due to the discrete parts. However, there exists a need for accelerometer that has a smaller size and lower price, especially in the cost-sensitive consumer market.

Optical interferometers, as a fundamental tool, are indispensable in many high-resolution measurements. In principles, an optical interferometer is capable of highly sensitive detection. In reality, however, there are several factors which limit the interferometer performance. The factors include optical power variation, wavelength shift, and refractive index change, all of which are quite common in practice and expensive to manage. In other words, it is difficult to keep the input power, wavelength, and refractive index at a constant value. For example, the output power of semiconductor laser not only varies with ambient temperature, but also declines with time in aging process. In addition, a laser's output spectrum changes because of temperature fluctuation and aging process, too. Temperature also causes change of the refractive index, which in turn may affect phase delay of a beam. Since the interference intensity is determined by the input power and phase difference and the phase difference is dependent upon the wavelength and refractive index, calibration of the input power, wavelength, and refractive index becomes critical to high-resolution interferometric measurements. Otherwise, when the interference intensity changes, it is hard to tell whether it is caused by a variable to be measured or any of the aforementioned factors. On the other hand, the current high-resolution methods for testing the parameters, especially the wavelength, are bulky and costly. Therefore, it is quite desirable to monitor the parameters, i.e. the wavelength, temperature, refractive index, and input power, in an effective yet low-cost way.

OBJECTS AND ADVANTAGES

Accordingly, several main objects and advantages of the present invention are:

a). to provide an improved interferometric MOEMS acceleration sensor;

b). to provide such a sensor which has a small size and low cost; and c). to provide such a sensor which is able to monitor the wavelength, refractive index, temperature, and input optical power to obtain enhanced sensitivity and resolution at low cost.

Further objects and advantages will become apparent from a consideration of the drawings and ensuing description.

SUMMARY

In accordance with the present invention, a self-mixing optical interferometer is combined with a cantilever to make a high-resolution MOEMS accelerometer. The resulting device is compact and can be built at low cost using the semiconductor processing technologies. Furthermore, because the self-mixing interferometer is small in size and on-chip, multiple interferometers along with on-chip photodetectors (PDs) can be arranged in a device conveniently. The interferometers and PDs are utilized to achieve highly sensitive optical detection through monitoring the wavelength, temperature, refractive index, and input optical power and performing differential measurements.

ABBREVIATIONS

MEMS Micro-electro-mechanical systems
MOEMS Micro-opto-electro-mechanical systems
PD Photodetector

DRAWING FIGURES

FIGS. 1-A to 1-C show respectively the prior-art optical interferometer, self-mixing optical interferometer, and interferometric MOEMS accelerometer.

FIGS. 2-A and 2-B are schematic cross-sectional and top view showing an embodiment of MOEMS accelerometer with an integrated self-mixing interferometer according to the invention.

REFERENCE NUMERALS IN DRAWINGS

| 10 | Beam | 12 | Cantilever |
|---|---|---|---|
| 14 | Isolation region | 16 | Fixed end |
| 18 | PD | 20 | Cantilever |
| 22 | Block | 24 | Spacer region |
| 26 | PD | 28 | Fixed end |
| 30 | Substrate | 32 | Block |
| 34 | Isolation layer | 36 | Cavity |
| 38 | Cantilever | 40 | Substrate |
| 42 | Fixed end | 44 | Isolation region |
| 46 | Interferometer | 48 | Interferometer |
| 50 | Cantilever | 52 | PD |
| 54 | PD | 58 | Substrate |
| 60 | Cantilever | 62 | Interferometer |
| 64 | Interferometer | 66 | Interferometer |
| 68 | Cantilever | 70 | Interferometer |
| 72 | Substrate | 74 | PD |
| 76 | PD | 78 | Cavity |
| 79 | Substrate | 80 | Region of cantilever |
| 84 | Region of cantilever | 86 | Cavity |
| 88 | Chip | 90 | Beam |
| 91 | Channel | 92 | Channel |
| 93 | Lens | 94 | Isolation region |
| 95 | Fixed end | 96 | PD |
| 98 | PD | 100 | Spacer region |
| 102 | Channel | 104 | Isolation region |
| 106 | Channel | 108 | Cantilever |
| 110 | Substrate | 112 | Chip |
| 114 | Wire | 116 | Package |
| 118 | Package | 120 | Chip |
| 122 | Chip region | 124 | Chip region |

Figure 1:
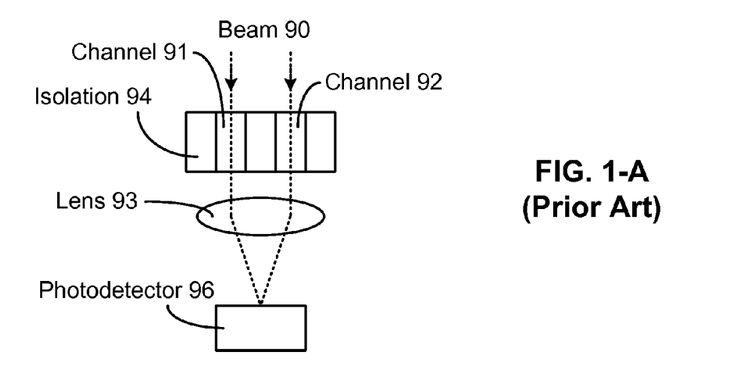

DETAILED DESCRIPTION—FIGS. 1-A TO 1-C—PRIOR-ART

A prior-art optical interferometer is shown in FIG. 1-A. The interferometer divides an incoming beam 90 into two beam portions by wavefront division. The portions are transmitted through channels 91 and 92 which are surrounded by isolation regions 94 and cause different phase retardation to the portions. After exiting the channels, the portions are mixed by a focus lens 93 to generate interference. A PD 96 is placed behind the lens to measure the interference intensity.

FIG. 1-B shows a prior-art self-mixing optical interferometer which has a more compact structure than the one of FIG. 1-A. The interferometer has two channels 102 and 106, which split beam 90 into two portions through wavefront division. Isolation regions 104 are made up of materials which stop light propagation. The dimension L, which is addition of the widths of the channels and spacing between them, is small such that when the portions come out of the channels, they merge together by themselves in a spacer layer 100 before entering a PD 98. In contrast to the setup in FIG. 1-A, due to the self-mixing effect, the device size is reduced because focus lens is no longer needed. The interferometer can be made in miniature size on a chip or even in nanoscale using the semiconductor technology.

FIG. 1-C illustrates a prior-art interferometric MOEMS accelerometer. A cantilever 108 has a fixed end 95 and substrate 110. Beam 90 is divided into two portions by the movable end of cantilever 108. One portion passes through the air, while the other portion through the cantilever and is phase delayed by it. The two portions are then mixed by lens 93 to cause interference. PD 96 is placed at the focusing area to measure the interference intensity. When the cantilever is tilted due to acceleration or deceleration, the optical path length inside the cantilever becomes longer, which increases the phase difference between the two portions. The change of phase difference in turn causes change of the interference intensity. Therefore the measured interference intensity is related the tilting angle, from which the acceleration can be derived.

FIGS. 2-A AND 2-B EMBODIMENTS OF MOEMS ACCELEROMETER

Figure 2:
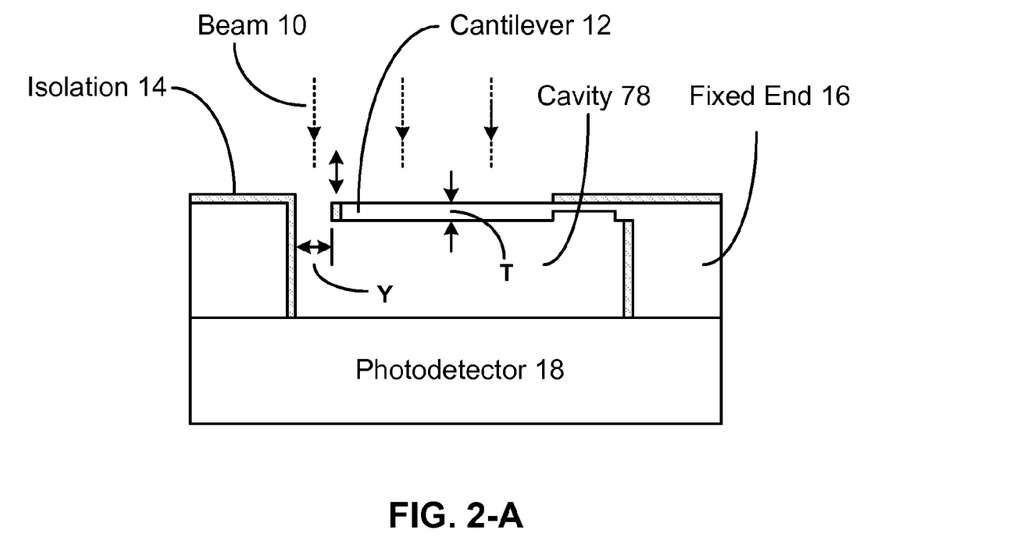

FIG. 2-A shows schematically an embodiment of interferometric MOEMS accelerometer in a cross-sectional view along a line YY' of FIG. 2-B, which is a schematic top view. A cantilever 12 has a fixed end 16, while the other end moves with acceleration or deceleration. As an incoming beam 10 is transmitted toward the device, part of it impinges onto the cantilever, which divides the beam into two beam portions by wavefront division. One portion passes through the cantilever and the other enters the gap partially surrounding the cantilever. The cantilever is made up of a transmissive material and has a thickness of T. An isolation layer 14 is disposed to stop light propagation, including sidewalls of a cavity 78 and the movable part of the cantilever. Values of Y, S, and W in FIGS. 2-A and 2-B are chosen such that the beam portions spread and merge by themselves in cavity 78 after going through the gap and cantilever. Phase difference between the two portions is determined by the refractive index of the cantilever material, thickness T and tilting angle of the cantilever.

Beneath the cavity a PD 18 is arranged to measure the interference intensity of the beam portions. Because of the self-mixing effect, there is no need for a focus lens as compared to the prior-art setup of FIG. 1-C. As a result, the accelerometer can be made smaller and at a lower cost. In addition, since the PD and cantilever structures are integrated, the MOEMS accelerometer can be fabricated in miniature size conveniently.

FIGS. 3 AND 4 EMBODIMENTS OF MOEMS ACCELEROMETER

Figure 3:
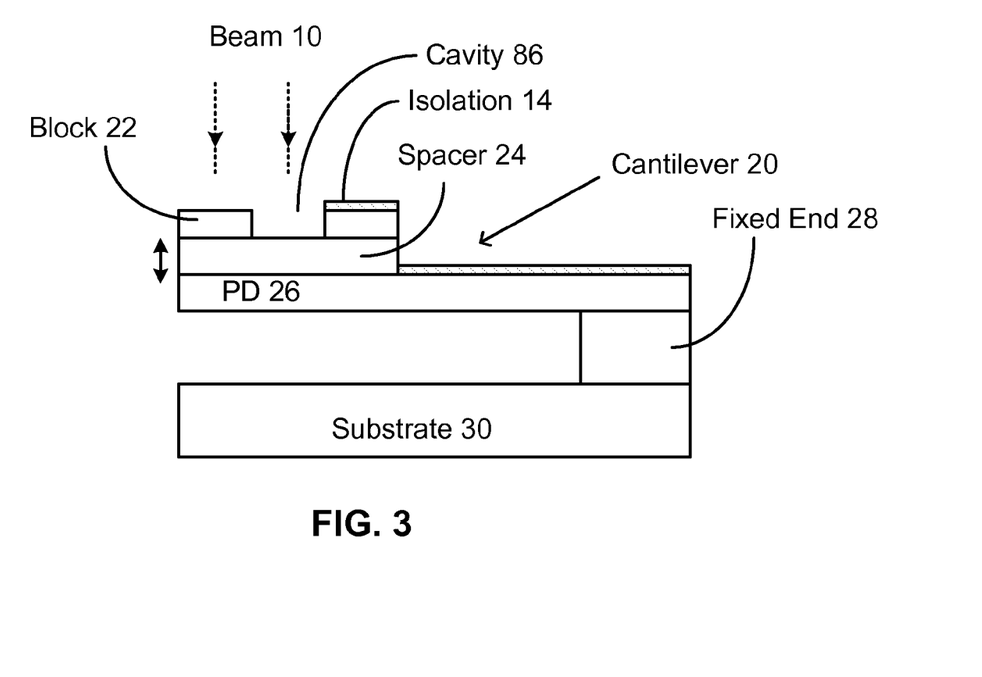
FIGS. 3 and 4 are schematic cross-sectional and perspective view showing embodiments of MOEMS accelerometer having a self-mixing interferometer built on a cantilever according to the invention.

FIG. 3 illustrates schematically yet another MOEMS accelerometer embodiment in a cross-sectional view. Compared to the setup of FIG. 2-A, a PD 26 is built on a cantilever 20. Above the PD, there is a self-mixing interferometer. The interferometer contains a cavity 86, a transparent block 22, and a spacer layer 24. Again, isolation layer 14 is deposited to block light for reducing noise and defining light path. Isolation sidewalls are omitted in the figure for simplicity reasons. The cantilever is fastened at a fixed end 28 which is placed on a substrate 30. When beam 10 is transmitted to the cantilever, it is split into beam portions by wavefront division. One portion passes through block 22, and the other through the air in the cavity. Dimensions of block 22 and cavity 86 are selected such that the two portions mix together by themselves in the spacer layer before being detected by PD 26.

Like the MOEMS accelerometers aforementioned, when cantilever 20 is tilted, phase difference between the two portions changes, which in turn causes change of the interference intensity.

Figure 4:
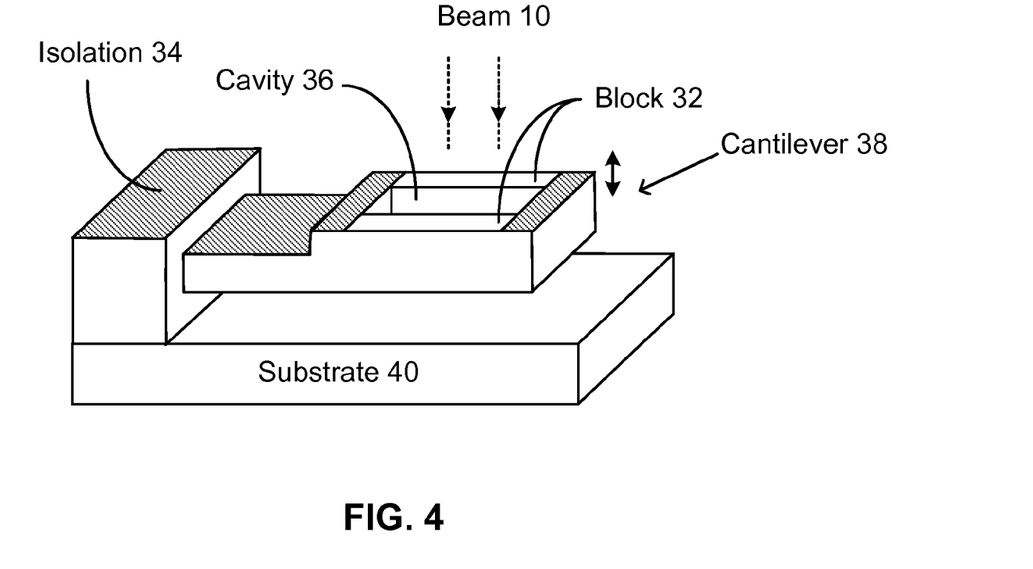

Another MOEMS accelerometer embodiment with a similar scheme to that of FIG. 3 is depicted graphically in a perspective view in FIG. 4. Again, a self-mixing interferometer is built on a cantilever 38. The upper part of the cantilever contains a cavity 36 and transparent blocks 32. The cavity and blocks generate two types of passages for incident beam 10.

One passage is through the air in the cavity and the other through the blocks. The lower part of the cantilever contains a spacer and PD region (both not shown in FIG. 4) beneath the cavity and blocks. The device is placed on a substrate 40. An isolation layer 34 is deposited to block light from entering the PD region (Isolation layers on sidewalls of the block region are not shown in FIG. 4).

Once again, dimensions of cavity 36 and blocks 32 are selected such that the beam portions, which emerge from the block and cavity region, are mixed together by themselves in the spacer region.

Like the embodiment of FIG. 2-A, accelerometers described in FIGS. 3 and 4 can be made small at low cost using semiconductor technologies.

FIG. 5 EMBODIMENT OF MEASUREMENT SCHEME

A self-mixing interferometer can be made in small dimensions on a chip using current technologies. As a result, multiple interferometers can be integrated together to realize high resolution and large dynamic range for measurements. Moreover, the PD, which is integrated with an interferometer, can be readily utilized to monitor and calibrate the optical power of an incident beam, which further improves the measurement accuracy.

Figure 5:
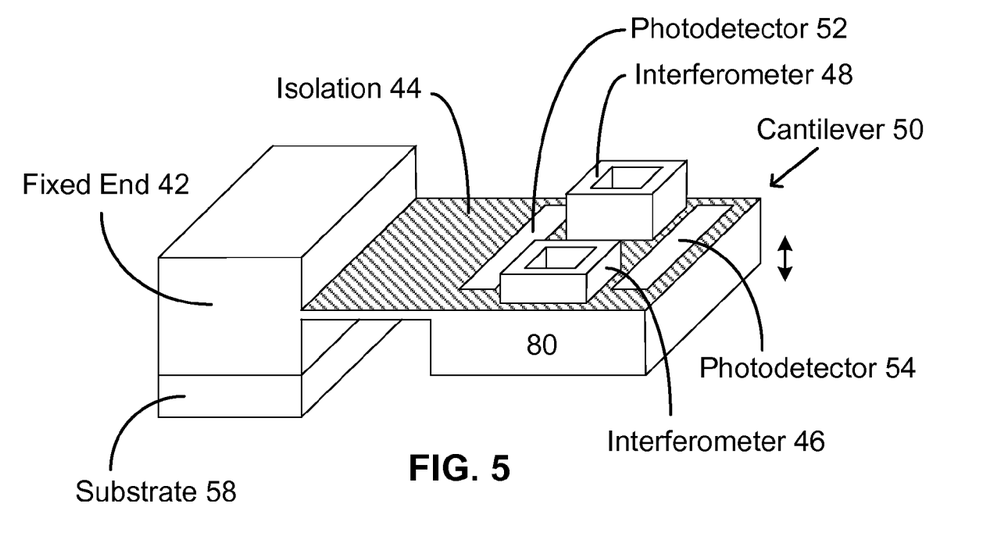
FIG. 5 is a perspective view showing schematically a MOEMS accelerometer embodiment where PDs and self-mixing interferometers are built on a cantilever according to the invention.

FIG. 5 shows schematically a MOEMS accelerometer embodiment which integrates multiple interferometers and PDs. As in FIG. 5, an accelerometer comprises a cantilever 50 on which there are interferometers 46 and 48 and monitor PDs 52 and 54. The monitor PDs are disposed in a spacer and PD region 80, where there are also PDs arranged for interferometers 46 and 48 (PDs with them are not shown in the figure). Region 80 may have electrical circuits as well (circuits not shown). The circuits may be used to process and transmit signals from the PDs and monitor PDs. The cantilever has a fixed end 42 on a substrate 58. Isolation layer 44 is deposited to reduce the signal noise and prevent the potential circuits on the cantilever from being affected by photo currents.

Because the monitor PDs receive incident light directly and are positioned substantially close to the interferometers, they can be used to measure optical power of an incoming beam accurately and effectively, serving the purpose of high-resolution power calibration for the interferometers next to them. More PDs may be placed between and around the interferometers for a more complex situation.

Interferometers 46 and 48, sitting on the same cantilever, undergo the same tilting experience subject to the same acceleration. The interferometers can be designed to generate different interference intensity values, which may be used to perform differential measurement as well-known in the field. For example, it can be designed such that when there is neither acceleration nor deceleration, both interferometers produce the same interference intensity, with one interferometer generating pi/2 phase difference for two beam portions and the other interferometer generating 3pi/2 phase difference for the other two portions. As a result, in cases when the cantilever tilts due to certain acceleration, if the interference intensity of one interferometer is decreased by a quantity, the interference intensity of the other interferometer will be increased by the same quantity. So subtraction between the two intensity values not only represents the degree of cantilever tilting, but also cancels the source noise in the meantime.

The power monitoring and differential measurement scheme improve the accuracy of acceleration measurement.

FIGS. 6 AND 7 EMBODIMENTS OF MEASUREMENT METHOD HAVING CALIBRATION MEANS

Figure 6:
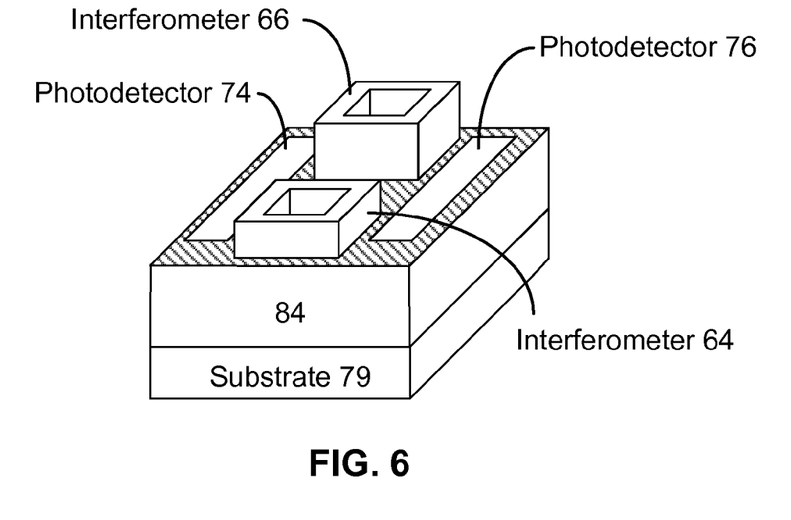
FIG. 6 is a perspective view showing schematically that multiple PDs and self-mixing interferometers are arranged for monitoring the parameters of an incoming beam according to the invention.

Multiple interferometers and PDs can also be utilized to calibrate important parameters in a measurement. FIG. 6 depicts schematically an embodiment of interferometric calibration method in a perspective view. The configuration is fixed with no moving parts. Thus any influence of the acceleration is excluded. A spacer and PD region 84 is built on a substrate 79. Two interferometers 64 and 66 are fabricated and placed above the spacer and PD region. PDs 74 and 76 are of power monitors. Like the setup description of FIG. 5, PDs working for the interferometers are not shown in the figure.

The interferometers in FIG. 6 are made by materials whose characteristics such as the temperature coefficient are known. Assume the incident angle of incoming beam remains stable. Performance specifications of the interferometers, including the value of interference intensity versus phase difference, are predetermined and stored in the data base.

First, the input power is measured by PD 74 and 76 and becomes a calibrated parameter in the test. When there is any change of interference intensity, variation of the wavelength or refractive index or both might be the cause. The intensity change might be small, but it may be unacceptable in a high-resolution measurement. For a setup containing only a single interferometer, it is difficult to determine which parameter it is, because there is only one result but with two unknown factors involved. However, when there are two interferometers as in FIG. 6, or more than two interferometers, the two variables can be derived using two or more results. In other words, when there are two or more equations with two unknown variables, the variables can be resolved. Calculation methods include analytical or numerical schemes which are well-known in the field. In addition, the interferometers may comprise materials having different refractive indexes with different temperature coefficients, which may simplify the process to derive the variables. Furthermore, matching interferometers can be added to the configuration to carry out differential measurements. Because of the miniature size and compatibility with the regular semiconductor process, the calibration structure, though comprising multiple functions and devices, can be made inexpensively and conveniently. Therefore, variation of the wavelength, refractive index, and input power can be monitored and calibration performed constantly and cost-effectively.

Another application of the setup in FIG. 6 is of high-resolution temperature measurement. Once the value of refractive index becomes known, the temperature, which causes the index change, is obtained almost automatically, since the index variation with temperature can be obtained at high accuracy. Therefore, besides wavelength and refractive index calibration, the scheme of FIG. 6 can be used for high-resolution temperature measurement as well.

Figure 7:
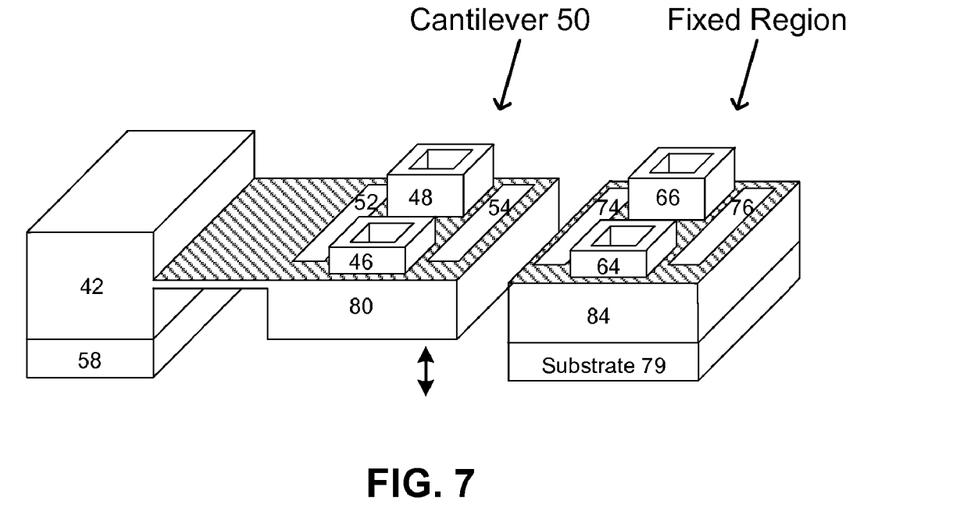
FIG. 7 is a schematic perspective view showing a MOEMS accelerometer having multiple self-mixing interferometers and PDs according to the invention.

FIG. 7 shows graphically a MOEMS accelerometer embodiment which combines schemes in FIGS. 5 and 6. Because the fabrication process of above-mentioned interferometers, PDs, and cantilevers is based on similar semiconductor technologies, various types of movable and fixed devices can be integrated together. In FIG. 7, interferometers 46 and 48 are used to detect acceleration by differential measurement, while interferometers 64 and 66 are employed to provide the wavelength, refractive index, and temperature calibration.

In yet another scheme, interferometers 46 and 64, and 48 and 66 are made identical respectively. Thus, any difference of the interference intensity within a pair is the result of cantilever tilting. The fixed interferometers function not only as a calibration tool, but also as part of the acceleration measurement.

FIG. 8 EMBODIMENT OF MOEMS ACCELEROMETER

Figure 8:
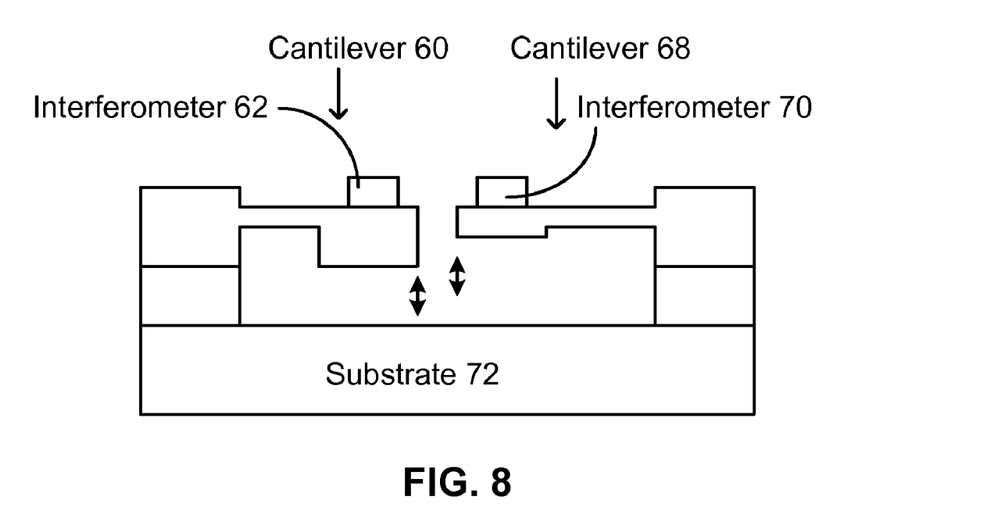
FIG. 8 is a schematic cross-sectional view of a MOEMS accelerometer having different cantilevers according to the invention.

FIG. 8 illustrates another embodiment of MOEMS accelerometer in a cross-sectional view. On a substrate 72, there are two cantilevers 60 and 68 which carry movable masses of different dimensions. The movable masses are designed to fit different dynamic ranges of acceleration detection. Interferometers 62 and 70 are used to show schematically how acceleration is tested. They may have a configuration as the one of FIG. 5. Fixed interferometers for calibration purpose may also be included in the system as that in FIG. 7. This embodiment aims to increase the dynamic range of acceleration measurement.

FIGS. 9 AND 10 EMBODIMENTS OF MOEMS ACCELEROMETER SYSTEMS

Figure 9:
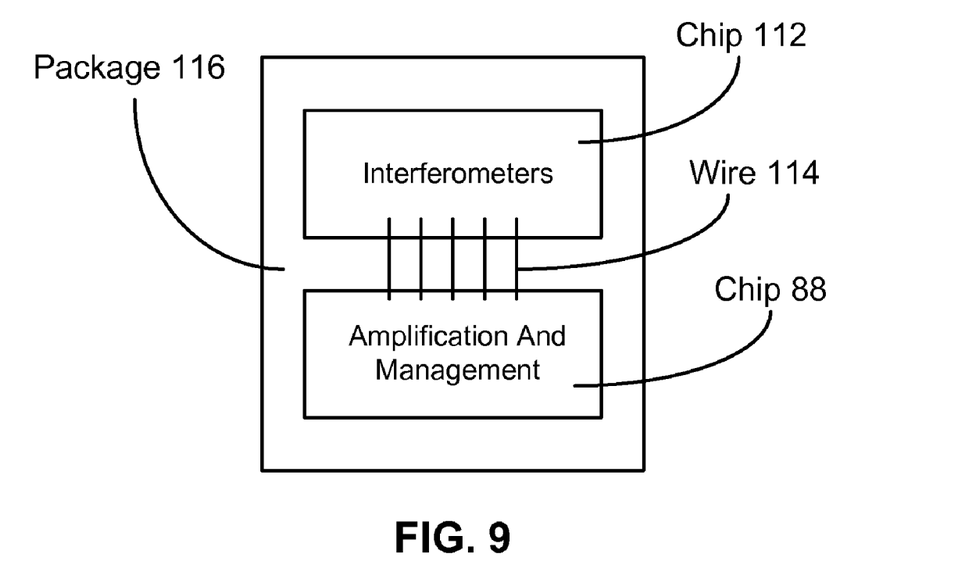
FIGS. 9 and 10 are schematic diagrams showing embodiments of MOEMS accelerometer with data processing capability according to the invention.

FIG. 9 shows a schematic diagram of a MOEMS accelerometer system. The system comprises a chip 112 which houses integrated PDs and interferometers for signal detection, and a chip 88 which contains integrated circuits for signal amplification and processing. The chip are connected by wires 114 and disposed in a package 116.

In a measurement, an amplifier is usually needed since a miniature interferometer has a miniature PD whose photo current signal is small and may require amplification. For such a purpose, a transimpedance amplifier is the most used and preferred. As there are multiple interferometers and PDs, processing and management capability is needed to convert signals to useful data and store them temporarily on the chip.

The interferometers and PDs are built on a semiconductor substrate. The same substrate and layers grown on it can be utilized to fabricate signal amplification and processing circuits. As a result, a MOEMS accelerometer system can be built on one chip, as is shown in a schematic diagram in FIG. 10.

Figure 10:
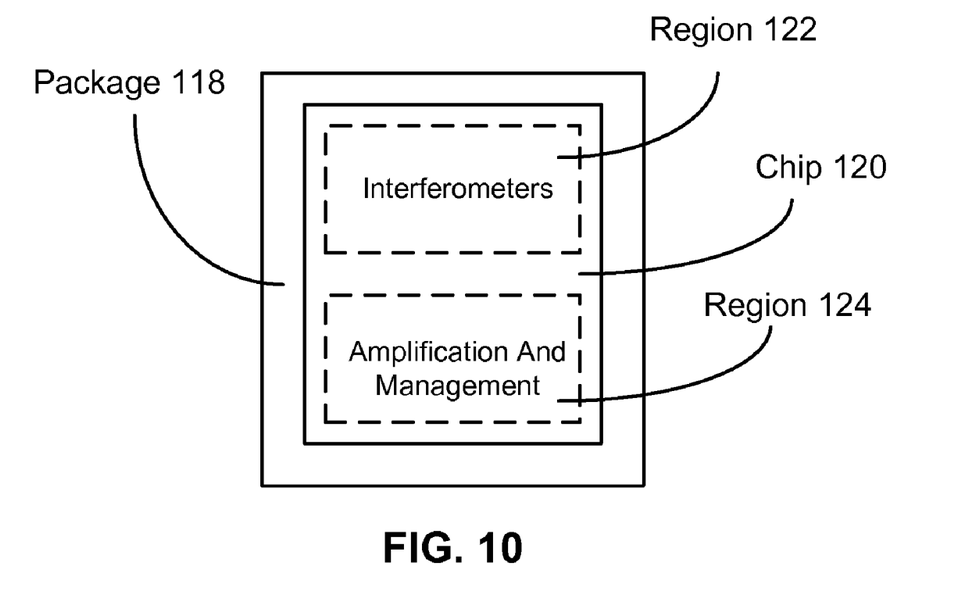

A package 118 in FIG. 10 contains a chip 120 where interferometers and PDs are located in a region 122 and the integrated circuits in a region 124. Because the circuits can be made around interferometers, PDs, and even on a movable mass, the two regions may also be mixed.

CONCLUSION, RAMIFICATIONS, AND SCOPE

Thus it can be seen that I have utilized multiple interferometers and PDs to provide an improved MOEMS accelerometer system.

The MOEMS accelerometer system has the following advantages:

High resolution and high sensitivity at low cost because of measurement of the wavelength, temperature, refractive index, and input power using multiple interferometers and PDs.

Compact size and low cost due to integration of the self-mixing interferometers and cantilever.

Compact size due to PDs built on a cantilever for power monitoring.

Although the description above contains many specificities, these should not be construed as limiting the scope of the invention but as merely providing illustrations of some of the presently preferred embodiments. Numerous modifications will be obvious to those skilled in the art.

RAMIFICATIONS

The isolation region on a surface and sidewalls may comprise different materials according to different processes used. Although in above discussions a beam is often split into two portions, a beam can also be divided into three portions or more to generate multi-wave interference to get a similar or better result.

For the self-mixing interferometer as discussed, dimensions along one direction is small so that interference occurs after two beam portions merge together by themselves. But small dimensions lead to small signal intensity. To overcome it, a number of miniature interferometer may be integrated together to increase the signal power. Another way is to elongate dimensions in the other direction, since one direction is enough for the self-mixing effect. For example in FIG. 6, shape of the cavity may be elongated in one direction, resulting in a narrow rectangular pattern.

Lastly, the schemes as presented above can be applied to fabricate sensors for pressure, vibration, or shock measurements. The same principles may also be used to measure gravity, radiation, electrostatic fields, magnetic fields, chemicals, or combinations.

Therefore the scope of the invention should be determined by the appended claims and their legal equivalents, rather than by the examples given.

The invention claimed is:

1. A method for performing measurements, comprising:
   1) dividing an optical beam into at least a plurality of first beam portions and a plurality of second beam portions by wavefront division using a plurality of phase means, said method arranged such that said phase means influence said first and second beam portions only once;
   2) phase shifting said first and second beam portions using said phase means respectively;
   3) generating optical interference among said first beam portions and among said second beam portions in separate places respectively;
   4) receiving a plurality of signals of said interference respectively;
   5) sensing optical power of said optical beam; and
   6) determining value of physical information using said signals and said optical power, said method arranged such that said value influences at least one of said signals.

2. The method according to claim 1, further including performing differential measurement.

3. The method according to claim 1 wherein said physical information includes at least one of a plurality of following items:
   a) wavelength information of said optical beam,
   b) temperature information involving temperature, said temperature affecting said phase shifting step, or
   c) refractive index of a medium, at least one of said first and second beam portions arranged to pass through said medium.

4. The method according to claim 1 wherein the step of generating optical interference includes using self-mixing effect.

5. The method according to claim 1 wherein the step of dividing said optical beam includes using a movable mass, at least part of said signals influenced by said mass.

6. A sensing apparatus comprising:
1) a plurality of side-by-side first regions for transmitting a plurality of beam portions and producing phase shift on said beam portions respectively, said first regions having a transmissive medium respectively;
2) said apparatus arranged such that said first regions influence said beam portions only once and at least one of said first regions is movable, said at least one of said first regions arranged to move separately relative to another of said first regions, positional status of said at least one of said first regions influencing said phase shift of one of said beam portions;
3) said apparatus arranged such that said beam portions are disposed side by side along a direction in a second region after exiting said first regions, the beam width of one of said beam portions along said direction in said second region is around or smaller than the wavelength of said beam portions, said beam portions arranged to propagate, mix together by self-mixing effect, and interfere with each other substantially in a third region for generating at least one resulting beam within a substantially short distance, said second region arranged adjacent to said first regions, said third region arranged adjacent to said second region; and
4) usage means for receiving said resulting beam within a substantially short distance.

7. The sensing apparatus according to claim 6 wherein said beam portions are arranged to produce a plurality of interference signals in said third region.

8. The sensing apparatus according to claim 6, further including a detector for sensing the power of one of said beam portions.

9. The sensing apparatus according to claim 6, further including a mechanism for performing differential measurements.

10. The sensing apparatus according to claim 6 wherein said first regions and said usage means are arranged to be integrated.

11. A sensing apparatus comprising:
1) a first detector for sensing the power of an optical beam;
2) a first self-mixing interferometer comprising a structure for splitting said optical beam into a plurality of beam portions by wavefront division and generating interference among said beam portions; and
3) a second detector for sensing interference signal of said interference;
4) said first detector and said structure arranged to be substantially proximate.

12. The sensing apparatus according to claim 11, further including a second self-mixing interferometer for performing differential measurements.

13. The sensing apparatus according to claim 11, further including at least a second self-mixing interferometer for performing measurements of physical information such as wavelength information of said optical beam or refractive index data of a medium which at least one of said beam portions is arranged to pass through, said apparatus arranged such that said physical information influences said interference signal.

14. The sensing apparatus according to claim 11 wherein said structure includes a movable mass, said mass arranged to influence said interference signal.

15. The sensing apparatus according to claim 11, further including integrated data means for processing data generated by said first and second detector.

16. The sensing apparatus according to claim 11 wherein said first detector and said structure are arranged to be integrated.

17. A sensing apparatus comprising:
1) a movable mass, said mass created by micromachining or semiconductor technologies or other technologies of making microscale or nanoscale structures; and
2) a detector having a first region for sensing the power of an optical beam, said apparatus arranged such that said optical beam impinges on said mass and at least a portion of said optical beam is transmitted to said first region by passing through a second region of said mass;
3) said apparatus arranged such that said first region and a part of said mass are in substantially close proximity and said mass and said detector are arranged to be integrated.

18. The sensing apparatus according to claim 17, further including an optical interferometer, said interferometer arranged to be integrated with said mass, said mass affecting interference produced by said interferometer.

19. The sensing apparatus according to claim 17 wherein said mass comprises said first region.

20. The sensing apparatus according to claim 17 wherein said detector comprises a plurality of detection units.

* * * * *